United States Patent
Kim et al.

(10) Patent No.: US 10,327,130 B2
(45) Date of Patent: Jun. 18, 2019

(54) METHOD FOR RECEIVING AND TRANSMITTING TAU-LESS PSM RELATED SIGNAL IN WIRELESS COMMUNICATION SYSTEM, AND APPARATUS THEREFOR

(71) Applicant: LG ELECTRONICS INC., Seoul (KR)

(72) Inventors: Laeyoung Kim, Seoul (KR); Sungduck Chun, Seoul (KR); Jinsook Ryu, Seoul (KR); Hyunsook Kim, Seoul (KR); Jaehyun Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/561,324

(22) PCT Filed: Mar. 28, 2016

(86) PCT No.: PCT/KR2016/003127
§ 371 (c)(1),
(2) Date: Sep. 25, 2017

(87) PCT Pub. No.: WO2016/153327
PCT Pub. Date: Sep. 29, 2016

(65) Prior Publication Data
US 2018/0103367 A1    Apr. 12, 2018

Related U.S. Application Data
(60) Provisional application No. 62/138,404, filed on Mar. 26, 2015.

(51) Int. Cl.
*H04W 8/08* (2009.01)
*H04W 36/00* (2009.01)
(Continued)

(52) U.S. Cl.
CPC ......... *H04W 8/08* (2013.01); *H04W 36/0005* (2013.01); *H04W 52/02* (2013.01);
(Continued)

(58) Field of Classification Search
CPC ... H04W 8/08; H04W 36/0005; H04W 76/14; H04W 60/00
See application file for complete search history.

(56) References Cited

U.S. PATENT DOCUMENTS 8,725,160 B2 * 5/2014 Qiang .................. H04W 8/12
455/451
2011/0170517 A1 * 7/2011 Bakker ............ H04W 36/0033
370/331
(Continued)

FOREIGN PATENT DOCUMENTS

WO    WO 2015/021284 A1    2/2015

OTHER PUBLICATIONS

"3rd Generation Partnership Project; Technical Specification Group Services and System Aspects; Architecture Enhancements to Facilitate Communications with Packet Data Networks and Applications (Release 13)," 3GPP TS 23.682 V13.1.0, Mar. 2015, pp. 1-35.
(Continued)

*Primary Examiner* — Mohammad S Anwar
(74) *Attorney, Agent, or Firm* — Birch, Stewart, Kolasch & Birch, LLP

(57) ABSTRACT

An embodiment of the present invention relates to a method for receiving and transmitting, by a mobility management entity (MME), tracking area update (TAU)-less power saving mode (PSM) related signals, the method comprising the steps of: receiving, from a terminal, a first TAU request message including information related to a TAU-less PSM entity; transmitting a TAU accept message in response to the first TAU request message; and receiving a second TAU
(Continued)

request message including information related to release of the TAU-less PSM, wherein the second TAU request message including information related to release of the TAU-less PSM is regarded by the MME as an attach request.

13 Claims, 8 Drawing Sheets

(51) Int. Cl.
    *H04W 36/32*     (2009.01)
    *H04W 52/02*     (2009.01)
    *H04W 60/00*     (2009.01)
    *H04W 76/14*     (2018.01)

(52) U.S. Cl.
    CPC ....... *H04W 52/0212* (2013.01); *H04W 60/00* (2013.01); *H04W 76/14* (2018.02); *H04W 36/32* (2013.01); *Y02D 70/00* (2018.01); *Y02D 70/126* (2018.01); *Y02D 70/1224* (2018.01); *Y02D 70/1226* (2018.01); *Y02D 70/1242* (2018.01); *Y02D 70/1262* (2018.01); *Y02D 70/142* (2018.01); *Y02D 70/146* (2018.01); *Y02D 70/20* (2018.01); *Y02D 70/21* (2018.01)

(56) References Cited

U.S. PATENT DOCUMENTS

2014/0161007 A1*   6/2014   Donthi  ............. H04W 52/0216
    370/311
2014/0221010 A1*   8/2014   Gotou  .................... H04W 4/70
    455/456.1

OTHER PUBLICATIONS

Interdigital, "Clarifications for Power Savings Mode," SA WG2 Meeting #102, S2-141203, St. Julian's, Malta, Mar. 24-28, 2014, 3 pages.

LG Electronics, "Clarification on TAU Procedure for Power Saving Mode," SA WG2 Meeting #102, S2-141141, St. Julian's, Malta, Mar. 24-28, 2014, 3 pages.

LG Electronics, "Clarification on TAU/RAU Procedure for Power Saving Mode," SA WG2 Meeting #102, S2-141140, St. Julian's, Malta, Mar. 24-28, 2014, 2 pages.

* cited by examiner

METHOD FOR RECEIVING AND TRANSMITTING TAU-LESS PSM RELATED SIGNAL IN WIRELESS COMMUNICATION SYSTEM, AND APPARATUS THEREFOR

CROSS REFERENCE TO RELATED APPLICATIONS

This application is the National Phase of PCT International Application No. PCT/KR2016/003127, filed on Mar. 28, 2016, which claims priority under 35 U.S.C. 119(e) to U.S. Provisional Application No. 62/138,404, filed on Mar. 26, 2015, all of which are hereby expressly incorporated by reference into the present application.

TECHNICAL FIELD

Following description relates to a wireless communication system, and more particularly, to a method of transmitting and receiving a signal related to a TAU (tracking area update)-less PSM (power saving mode) and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Task

A technical task of the present invention is to define a new TAU-less PSM for V2X and operations of network nodes related to the new TAU-less PSM.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting and receiving a TAU (tracking area update)-less PSM (power saving mode)-related signal, which is transmitted and received by an MME (mobility management entity) in a wireless communication system, includes the steps of receiving a first TAU request message including information related to a TAU-less PSM entry from a UE, transmitting a TAU accept message in response to the first TAU request message, and receiving a second TAU request message including information related to release of the TAU-less PSM. In this case, the MME considers the second TAU request message including the information related to the release of the TAU-less PSM as an attach request.

To further achieve these and other advantages and in accordance with the purpose of the present invention, according to a different embodiment, an MME (mobility management entity) transmitting and receiving a TAU-less PSM-related signal in a wireless communication system includes a transceiver and a processor, the processor configured to receive a first TAU request message including information related to a TAU-less PSM entry from a UE, the processor configured to transmit a TAU accept message in response to the first TAU request message, the processor configured to receive a second TAU request message including information related to release of the TAU-less PSM. In this case, the MME considers the second TAU request message including the information related to the release of the TAU-less PSM as an attach request.

If the second TAU request message is received, the MME can transmit an ULR (update location request) message to an HSS.

Although the UE, which has transmitted the first TAU request message, does not transmit TAU, the MME may not detach the UE.

The TAU accept message can include information that indicates an eNode B to allocate a D2D resource to the UE.

The D2D resource can be used for uplink transmission of the UE in the TAU-less PSM.

The MME can delete a context of the UE after the TAU accept message is transmitted.

The TAU accept message can include information indicating that TAU is infinitely configured.

The TAU accept message can includes information indicating that a periodic TAU need not be performed.

The information related to the TAU-less PSM entry can include at least one selected from the group consisting of information indicating that the UE does not perform periodic TAU, information indicating that the UE temporarily performs detach, information indicating that the UE performs the TAU-less PSM, information indicating that the UE infinitely requests a periodic TAU timer, and information indicating that the UE is able to use D2D after the UE is switched off.

The information related to the release of the TAU-less PSM can include at least one selected from the group consisting of information indicating that TAU corresponds to TAU after the UE does not perform periodic TAU, information indicating that TAU corresponds to TAU after the UE temporarily performs detach, information indicating that the UE is released from the TAU-less PSM, and information indicating that TAU corresponds to TAU after the UE infinitely requests a periodic TAU timer.

The first TAU request message can be transmitted when the UE is switched off.

The second TAU request message can be transmitted when the UE is switched on.

Advantageous Effects

According to the present invention, a V2X terminal can promptly perform uplink transmission in a TAU-less PSM after the V2X terminal is switched off and network nodes can efficiently manage the TAU-less PSM.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
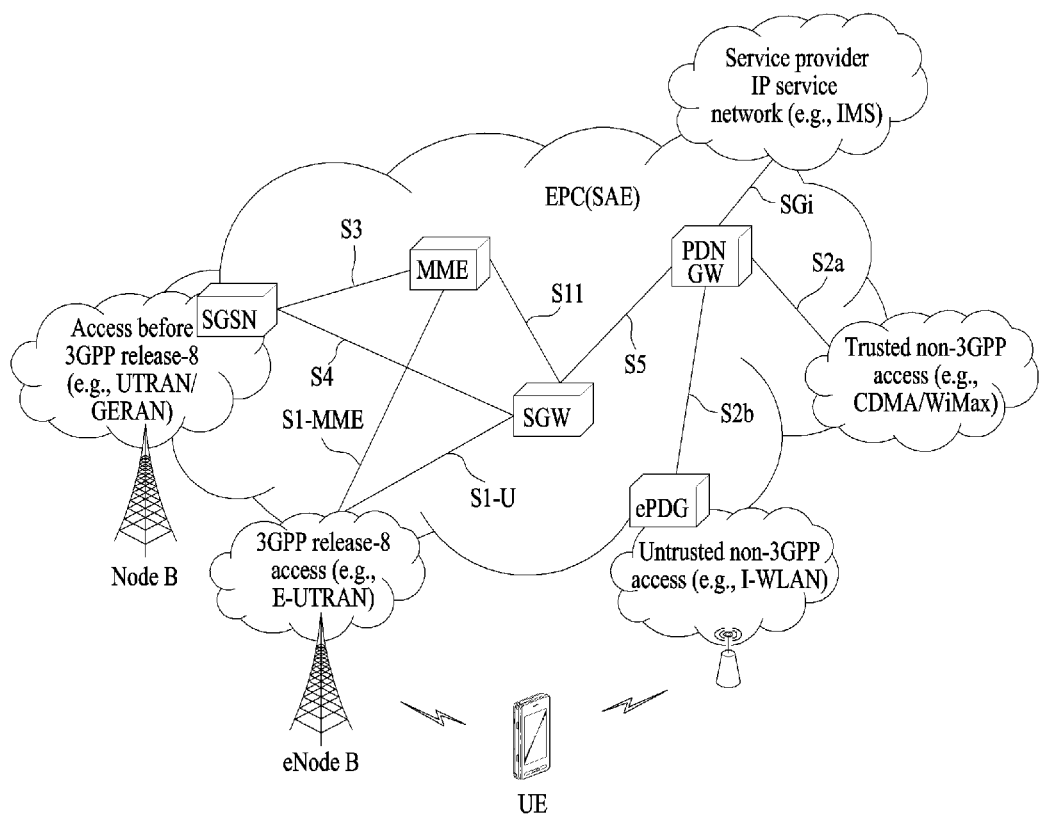
FIG. 1 is a schematic diagram for an EPS (Evolved Packet System) including an EPC (Evolved Packet Core)

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP (SUPL Location Platform): entity that controls Location Service Management and Position Determination. The SLP includes SLC (SUPL Location Center) function and SPC (SUPL Positioning Center) function. Details of the SLP will be understood with reference to Open Mobile Alliance (OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060].

MBSFN (MBMS Single Frequency Network): Simulcast transmission technique which is implemented by transmitting the same waveform to a plurality of grouped cells covering a certain area.

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
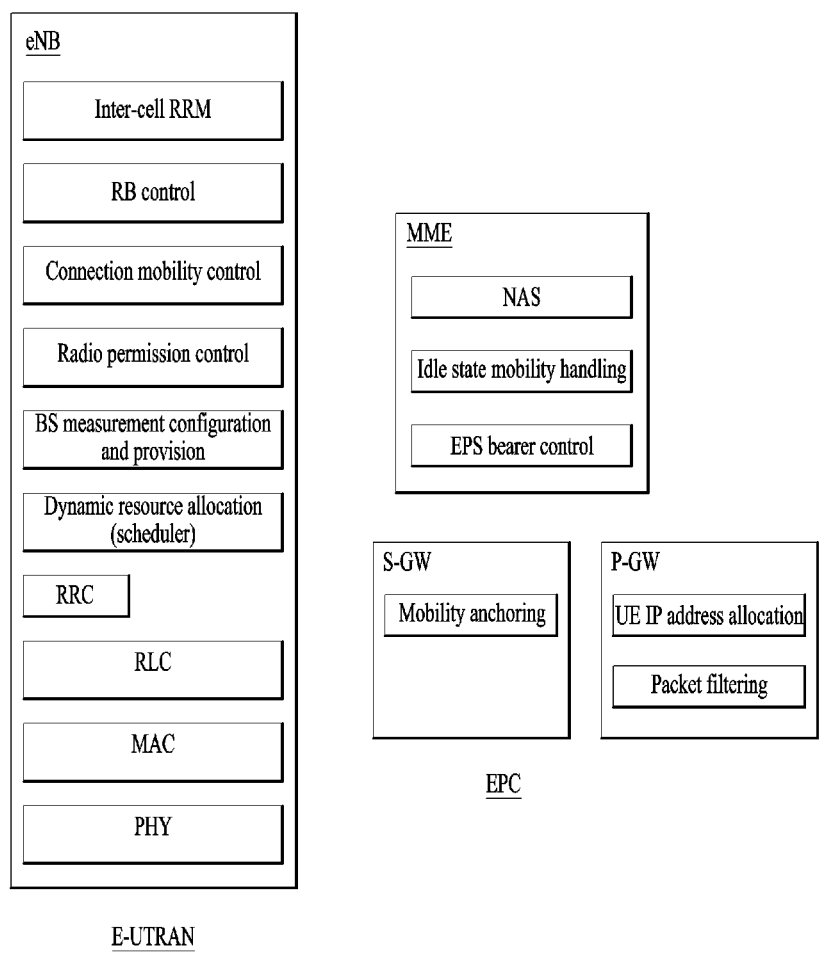
FIG. 2 is a diagram illustrating general architectures of E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
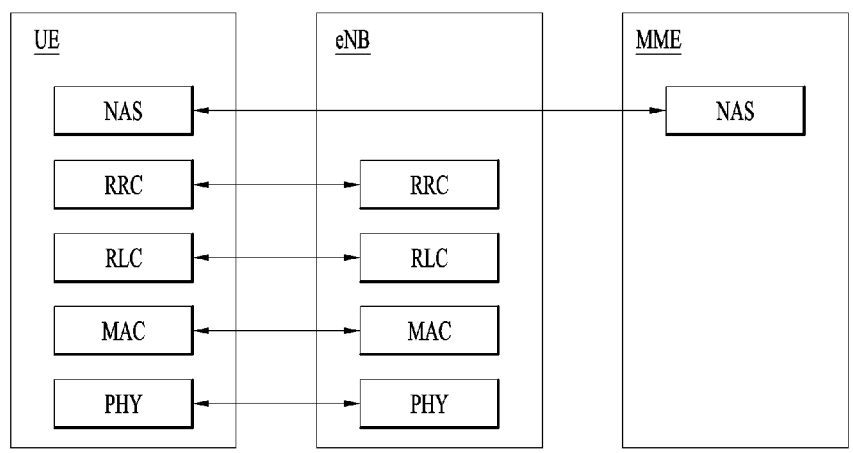
FIG. 3 is a diagram illustrating a structure of a radio interface protocol in a control plane.
Figure 4:
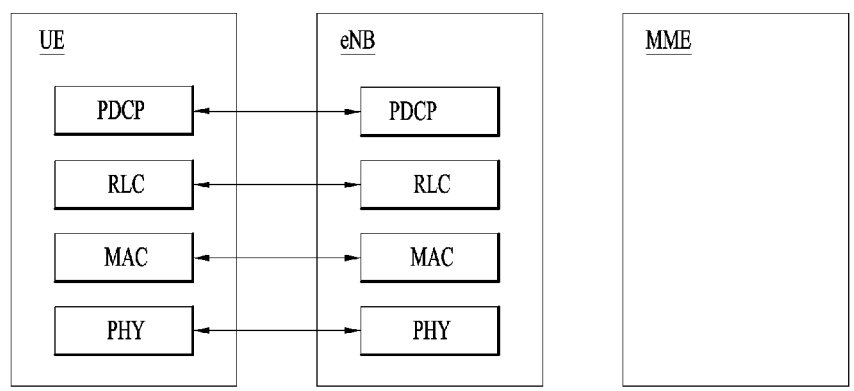
FIG. 4 is a diagram illustrating a structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
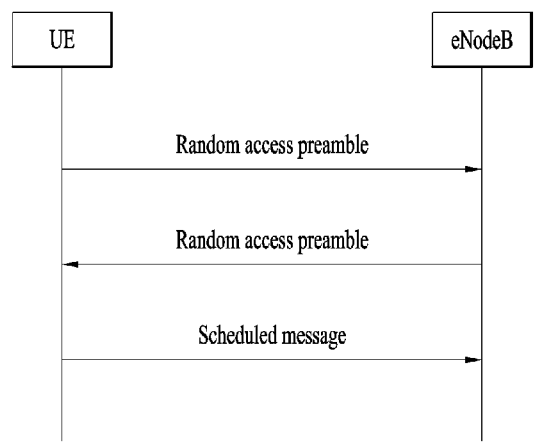
FIG. 5 is a flowchart for explaining a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
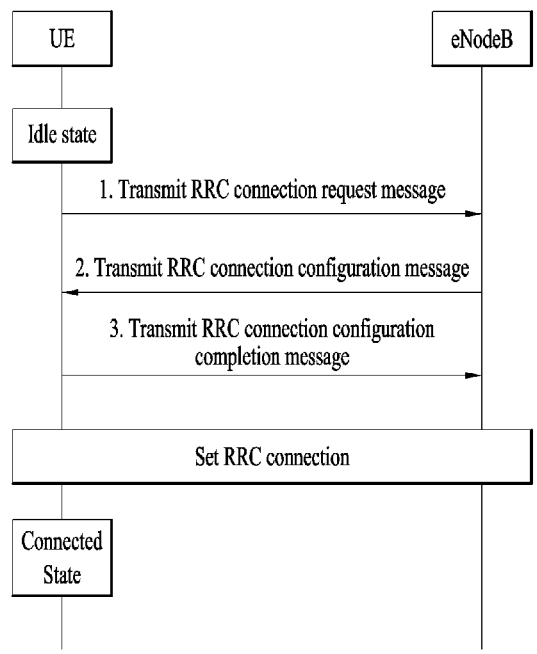
FIG. 6 is a flowchart illustrating a connection procedure in an RRC (radio resource control) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
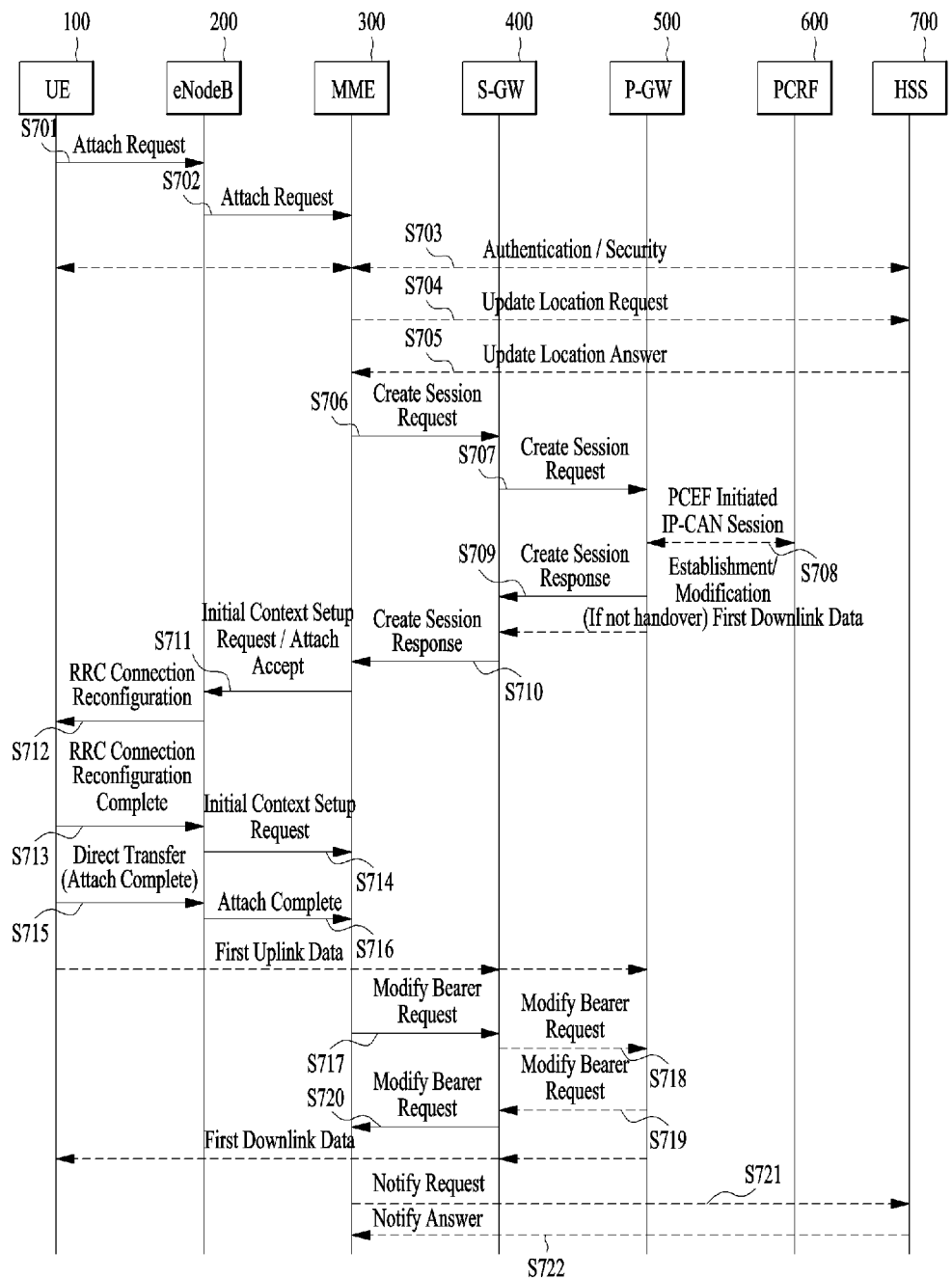
FIG. 7 is a flowchart for explaining an attach procedure.

FIG. 7 is a flowchart for explaining an attach procedure.

In the steps S701 to S702, a UE 100 transmits an initial attach request message to an MME 300 to initiate an attach procedure. The attach request message is forwarded to the MME 300 via an eNode B 200. The UE 100 can include UE capability information such as SRVCC (single radio voice call continuity) in the attach request message.

In the step S703, authentication and NAS security setup can be performed to activate integrity protection and NAS ciphering. The step S703 is performed when a UE context for the UE 100 does not exist in a network or integrity of the attach request transmitted in the step S701 is not protected.

In the step S704, the MME 300 can transmit a location update request message to a HSS 700. The step S704 is performed when the MME is changed after the last detach of the UE 100 or the MME 300 does not have valid subscription context of the UE 100.

In the step S705, the HSS 700 transmits a location update response message including subscriber information on the UE 100 to the MME 300.

In the step S706, the MME 300 selects an S-GW and allocates an EPS bearer identifier for a default bearer associated with the UE. Subsequently, the MME 300 transmits a session create request message to the selected S-GW 400.

If it is necessary for the MME to have voice support match indicator information on the UE 100 to determine an IMS voice over PS session supported indication value in a PS session (or domain), the MME 300 transmits a UE radio capability match request message to the eNode B 200.

In the step S707, the S-GW 400 creates a new entry in an EPS bearer table of the S-GW and transmits a session create request message to the P-GW 500 based on P-GW address information included in the session create request message received from the MME 300.

In the step S708, the P-GW 500 can perform IP-CAN session establishment/modification with a PCRF 600. The step S708 is performed when dynamic PCC (policy and charging control) is deployed.

In the step S709, the P-GW 500 creates a new entry in an EPS bearer context table of the P-GW and transmits a session create response message to the S-GW 400.

Unless the UE makes a handover, downlink data transmitted to the UE 100 can be forwarded to the S-GW 400 from the P-GW 500 after the step S709.

In the step S710, the S-GW 400 transmits a session create response message to the MME 300.

In the step S711, the MME 300 transmits an initial context setup request message, which includes an attach accept message transmitted to the UE 100, to the eNode B 200. The attach accept message includes IMS voice over PS session supported indication information in a PS session. As mentioned in the foregoing description, when an IMS voice over PS session supported indication value is determined, the MME may consider one or more elements described in the following.

- 'Voice over IMS' related capability information of UE:
  Voice supported match indicator information and/or SRVCC capability information provided by UE
- local policy
- HPLMN (home public land mobile network)
- SRVCC capability of network
- extends of E-UTRAN/UTRAN coverage
- If UE is in roaming state, roaming agreement with HPLMN of UE In the step S712, the eNode B 200 transmits an RRC connection reconfiguration message including EPS radio bearer identifier information to the UE 100 together with the attach accept message received from the MME 300.

In the step S713, the UE 100 transmits an RRC connection reconfiguration completion message to the eNode B 200.

In the step S714, the eNode B 200 transmits an initial context setup response message to the MME 300.

In the step S715, the UE 100 transmits a direct transmission message including an attach completion message, which is transmitted to the MME, to the eNode B 200.

In the step S716, the eNode B 200 forwards the attach completion message received from the UE to the MME 300.

The UE 100 can transmit uplink data after the step S716.

In the step S717, having received both the initial context setup response message and the attach completion message in the steps S714 and S716, the MME 300 transmits a bearer modification request message to the S-GW 400.

In the step S718, the S-GW 400 can transmit the bearer modification request message to the P-GW 500. The step 718 is performed when the bearer modification request message received in the step S717 includes handover indication information.

In the step S719, the P-GW 500 transmits a bearer modification response message to the S-GW 400 in response to the bearer modification request message.

In the step S720, the S-GW 400 transmits the bearer modification response message to the MME 300. Subsequently, the S-GW 400 can forward downlink data to the UE 100.

In the step S721, if it is necessary to store IDs of an APN, a PDN GW, etc. to support mobility to a non-3GPP access network, the MME 300 can perform an HSS registration procedure through a notification request message.

In the step S722, the HSS 700 transmits a notification response message to the MME 300 in response to the notification request message.

Figure 8:
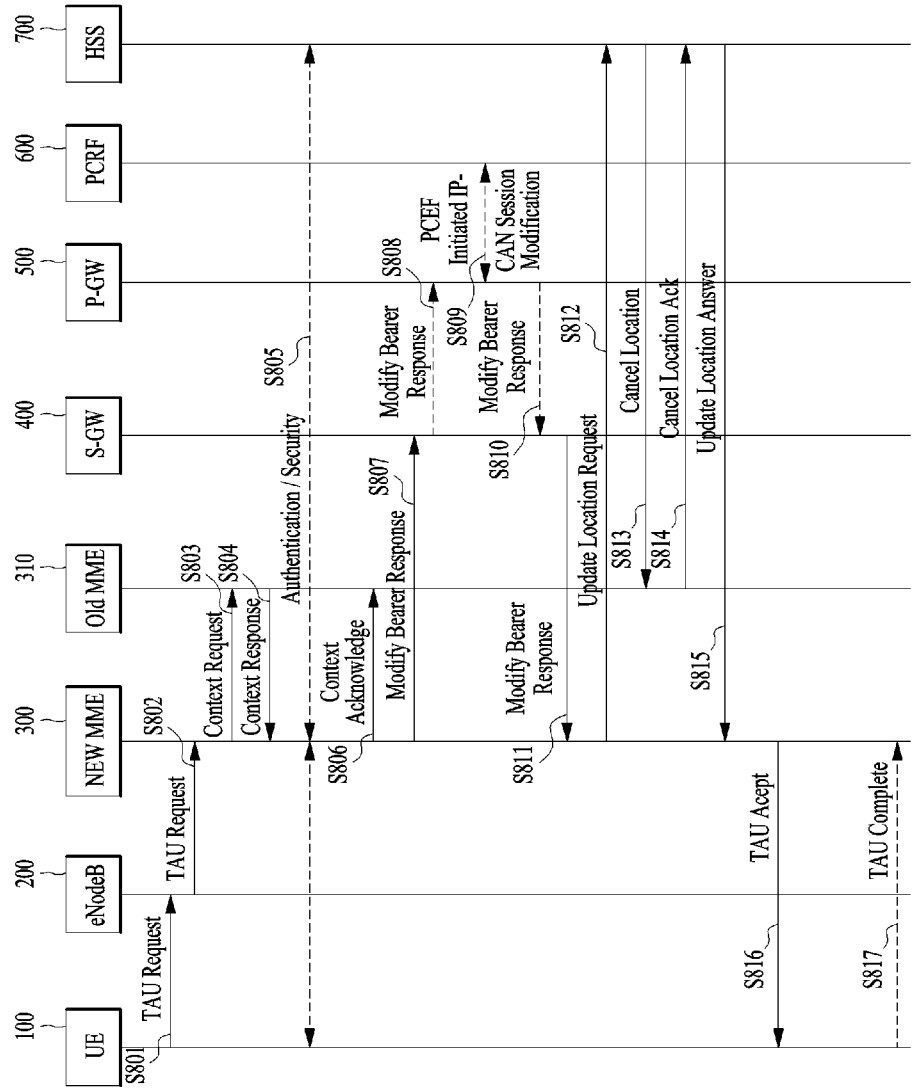
FIG. 8 is a flowchart for explaining a TAU procedure.

FIG. 8 is a flowchart for explaining a TAU (tracking area update) procedure.

Referring to FIG. 8, in the steps S801 to S802, the UE 100 transmits a TAU request message to the MME 300 to initiate a TAU procedure. The TAU request message is forwarded to a new MME 300 via the eNode B 200. The UE 100 can include SRVCC capability information in the TAU request message.

In the step S803, the new MME 300 transmits a context request message to an old MME 310 to obtain user information.

In the step S804, the old MME 310 transmits a context response message to the new MME 300 in response to the context request message. The context response message can include voice support match indicator information on the UE 100 in MM context.

In the step S805, authentication and security setup can be performed. The step S805 is performed when integrity of the TAU request message transmitted in the step S801 is not protected.

In the step S806, the new MME 300 transmits a context acknowledgment message to the old MME 310.

In the step S807, the new MME 300 transmits a bearer modification request message per PDN connection to the S-GW 400.

In the step S808, the S-GW 400 can transmit the bearer modification request message per PDN connection to the P-GW 500. The step S808 is performed when it is necessary for the S-GW 400 to inform the P-GW 500 of information (e.g., a changed RAT type, location information of a user, etc.).

In the step S809, the P-GW 500 can perform IP-CAN session modification with a PCRF 600. The step S809 is performed when a dynamic PCC is deployed and it is necessary for the P-GW 500 to provide information to the PCRF 600.

In the step S810, the P-GW 500 transmits a bearer modification response to the S-GW 400 in response to the bearer modification request message per PDN connection.

In the step S811, the S-GW 400 transmits the bearer modification response to the new MME 300.

In the step S812, the new MME 300 can transmit a location update request message to the HSS 700. The step S812 is performed when the new MME 300 does not have subscriber information on the UE 100.

In the step S813, the HSS 700 transmits a location cancellation message to the old MME 310.

In the step S814, the old MME 310 transmits a location cancellation Ack message to the HSS 700 in response to the location cancellation message.

In the step S815, the HSS 700 transmits a location update response message including subscriber information on the UE 100 to the new MME 300.

In the step S816, if the new MME 300 fails to receive voice support match indicator information from the old MME 310 in the step S804, the new MME 300 transmits a UE radio capability match request message to the eNode B 200. The new MME 300 transmits a TAU accept message to the UE 100. The TAU accept message includes IMS voice over PS session supported indication information in a PS session. When the new MME 300 determines an IMS voice over PS session supported indication value, the new MME may consider the elements mentioned earlier in the step S711 of FIG. 7.

In the step S817, the UE 100 can transmit a TAU completion message to the new MME 300. The step S817 is performed when GUTI (globally unique temporary identity) information is changed.

TAU-Less PSM (Power Saving Mode)

Currently, discussion on V2X communication as a form associated with D2D communication is in progress. V2X corresponds to a concept including V2V communication between vehicle terminals, V2P communication between a vehicle and a terminal of a different type, and V2I communication between a vehicle and an RSU (roadside unit). In relation to the V2X, it is necessary to define a PSM (power saving mode) of a new type due to the distinct characteristic of a V2X terminal. (For a legacy PSM, it may refer to 3GPP TS 23.682 4.5.4)

In case of a car, if the ignition is turned off (hereinafter, switch off), it is not necessary to transmit driving information and collected traffic information of the car to a network via D2D (device to device). And, in this case, it is not necessary to receive traffic information necessary for driving the car from a different car and/or a network. Hence, in this case, it may be able to make the car perform a detachment operation similar to a case that a general terminal performs a detachment operation when the terminal is switched off. However, when the car performs the detachment operation, if the car intends to notify an emergency situation, e.g., a situation that the parked car is stolen, a situation that the car is damaged, etc., through a network and/or D2D, the car should perform an attachment operation to establish a PDN connection. As a result, it is difficult to quickly process the notification.

Figure 9:
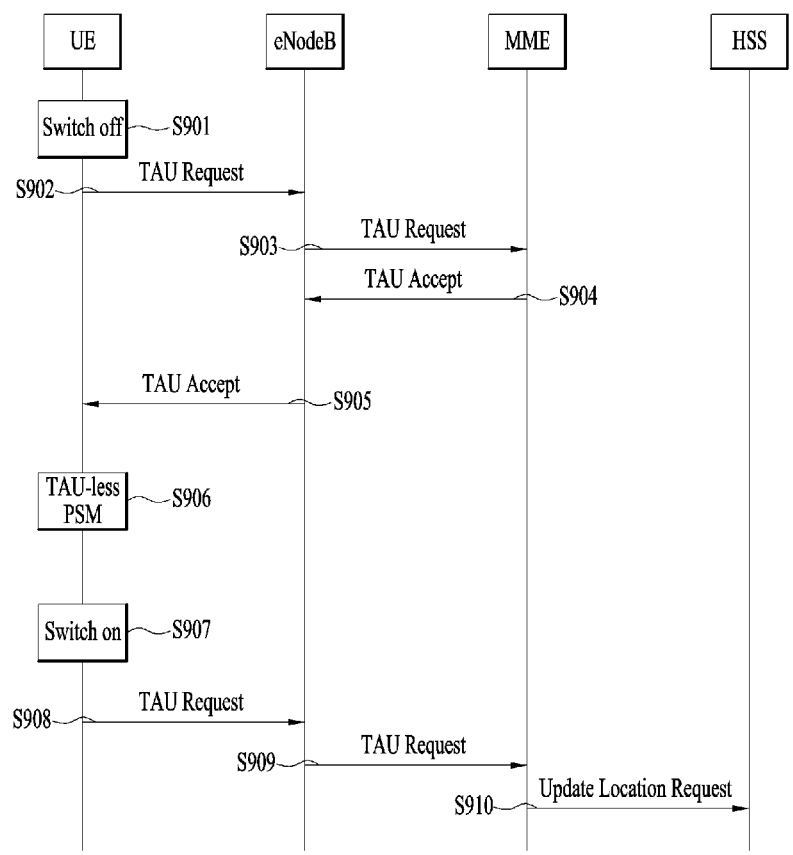
FIG. 9 is a flowchart for explaining the embodiment of the present invention.

In the following description, a PSM of a new type and a TAU-less PSM capable of quickly performing transmission in an emergency situation after a terminal is switched off are explained in detail in consideration of the characteristics of a V2X terminal. It may refer to the flow shown in FIG. 9 for the following description. However, all network nodes and signaling may be non-limited by FIG. 9.

According to the embodiment of the present invention, an MME can receive a first TAU request message including information on a TAU-less PSM entry from a UE [S901 to S903]. The first TAU request message can be transmitted when the UE is switched off. The MME can transmit a TAU accept message in response to the first TAU request message [S904]. The UE receives the TAU accept message from an eNB [S905] and can enter a TAU-less PSM [S906]. Subsequently, the MME can receive a second TAU request message including information related to the release of the TAU-less PSM [S908 to S909]. The second TAU request message can be transmitted when the UE is switched on. It may use an extended legacy different NAS message (e.g., detach request message, etc.) or a newly defined message instead of the first TAU request message to achieve the same purpose. For example, in case of using the detach request message, the information can be added to a legacy IE or a new IE. In case of using a different message rather than the TAU request message, the MME transmits a response message corresponding to the different message to the UE. It may use a newly defined message instead of the second TAU request message to achieve the same purpose. In this case, the MME transmits a response message to the UE in response to the newly defined message.

In this case, the MME may consider a second TAU request message including information related to the release of the TAU-less PSM as an attach request. Although the UE, which has transmitted the first TAU request message, does not transmit TAU, the MME may not detach the UE (store the determination in a UE context). Although the UE does not perform a periodic TAU procedure (or, although there is no communication with the UE for a long time), the MME can determine not to stop a service (The MME can store the determination in a UE context). As mentioned in the following description, the UE can perform uplink transmission using a specific D2D resource in the TAU-less PSM and the MME can delete the context of the UE after a TAU accept message is transmitted. Hence, although the UE is not detached, since the UE context is deleted, it is necessary for the MME to perform an attach procedure to perform a role of a serving node. However, if the attach procedure is performed again after TAU, it is inefficient. Hence, it may consider a TAU request, which is transmitted after the UE is released from the TAU-less PSM, as an attach request to improve efficiency. The uplink transmission can be interpreted as the meaning of uplink data transmission or mobile originating data transmission.

Having received the second TAU request message, the MME transmits a ULR (update location request) message to the HSS [S910]. The MME may indicate the eNode B to release D2D-related resources previously allocated to the UE. This indication can be performed via an S1-AP message when the TAU accept message, which is transmitted to the UE by the MME, is transmitted to the eNode B or an S1-AP message transmitted to the eNode B when S1 release is performed after TAU is completed, by which the present invention may be non-limited. The indication can be performed through various S1-AP messages at various timing.

In relation to the transmission of the first TAU request message including information on TAU-less PSM entry of the UE, the information on the TAU-less PSM entry can include at least one selected from the group consisting of information indicating that the UE does not perform periodic TAU, information indicating that the UE temporarily performs detach, information indicating that the UE performs TAU-less PSM, information indicating that the UE infinitely requests a periodic TAU timer, information indicating that the UE is able to use D2D after the UE is switched off, information indicating that the UE has D2D-related capability, and information indicating that the UE requires a D2D-related resource. Besides the TAU request message, it may also be able to use a legacy NAS message (e.g., detach request message, etc.) or a newly defined message for the same purpose. For example, in case of using the detach request message, it may be able to add the aforementioned information to a legacy IE or a new IE.

In relation to the TAU accept message, the TAU accept message can include information indicating that TAU is infinitely configured. Or, the TAU accept message can include information indicating that it is not necessary to perform a periodic TAU. Or, the TAU accept message can include information indicating that a request of the UE is permitted. It is not necessary for the MME to manage a periodic TAU timer. In particular, it is not necessary to initiate the periodic TAU timer.

Subsequently, the TAU accept message can include information indicating that the eNode B allocates a D2D resource to the UE. When the TAU accept message, which is transmitted to the UE by the MME, is transmitted to the eNode B, the D2D resource allocation can be performed via an S1-AP message or an S1-AP message transmitted to the eNode B when S1 release is performed after TAU is completed, by which the present invention may be non-limited. In particular, the D2D resource allocation can be performed at various timing via various S1-AP messages. In this case, the MME may include information received from the UE or information indicating that the D2D resource is used for a TAU-less PSM operation performed by the UE.

Having received the TAU accept message, the eNB can allocate a D2D resource to the UE. The D2D resource allocation can be performed via an RRC message, which is used for forwarding the TAU accept message to the UE, a separate RRC message (e.g., RRC connection release message, etc.), or an SIB (system information block). The allocated resource may have a form of a resource pool. It may be able to configure the UE to autonomously select a resource from the resource pool. Or, the UE may allocate a dedicated resource. Or, the allocated resource may correspond to a resource of a different form.

A D2D resource can be used for uplink transmission of the UE in the TAU-less PSM. In particular, although a TAU procedure is completed and the UE is in an off state, the UE does not release the D2D resource. The UE keeps the D2D resource. If the UE already has a D2D-related resource, the UE may use the resource. In this case, it may be able to configure the eNB not to perform a procedure of allocating a resource or a resource newly allocated by the eNB can be maintained only. In this case, although the TAU procedure is finished and the UE is switched to an off state, the UE does not release the resource. Or, the UE keeps the resource. Additionally, if the UE already has a D2D-related resource, the UE may add information requesting/indicating the MME to continuously use/maintain the D2D-related resource, when the operation mentioned earlier in [1] is performed. Optionally, the MME may inform the eNode B of the information. The D2D-related resource can be maintained even after the UE is switched on.

If the TAU procedure and/or the D2D-related resource allocation procedure is completed, the UE is turned off. In this case, if an emergency situation occurs, the UE performs one or more operations described in i) to iv) in the following. The operations are performed to inform a different UE/eNode B and/or a network near the UE of the emergency situation. i) The UE informs a different UE/eNode B and/or a network of information/situation through D2D. In this case, the D2D corresponds to a scheme that an adjacent different UE (a UE within a radio range) and/or the eNode B and/or an RSU (road side unit) receives the information/situation without passing through a core network. For example, the UE can perform the D2D operation (e.g., a D2D discovery operation, a D2D communication operation, etc.) in an idle mode or a connected mode. Or, the UE can perform the D2D operation before a mode is switched to the idle mode. This may indicate that the D2D operation can be performed without such an operation as cell selection/search or cell camping. According to a related art, in order to obtain a D2D resource for performing a D2D operation, it was necessary to receive SIB18 (direct communication-related system information) and/or SIB19 (direct discovery-related system information) broadcasted by the eNode B and determine whether to use a D2D resource based on autonomous resource selection or scheduled resource allocation. Yet, according to the present invention, although the UE enters the PSM, the UE is able to perform a D2D operation using a stored D2D resource. ii) The UE informs a network of information/situation. In this case, a network finally receiving the information/situation may correspond to at least one selected from the group consisting of an eNode B, an RSU, a server/function/center providing a V2X-related service, and a 3rd party server. When the UE informs the network of the information/situation, it may use various methods including a legacy packet transmission scheme, eCall, SMS, and the like. iii) A different UE can deliver/notify the information/situation to a further different UE via D2D. iv) The eNode B can deliver/notify the information/situation to a cell of the eNode B via broadcasting and the like. And, the eNode B can deliver/notify the information/situation to a neighboring eNode B.

An RSU can deliver/notify the information/situation via broadcasting and the like. And, the RSU can deliver/notify the information/situation to a neighboring RSU. The UE (specifically, NAS layer/AS layer/D2D-related layer of the UE) can sense an emergency situation based on information provided by an application layer (or upper layer)/various internal information (e.g., information through sensing, etc.). Besides the emergency situation, a condition for performing the aforementioned operation can be configured in advance. If the condition is satisfied, the aforementioned operation can be performed.

The information related to the release of the TAU-less PSM can include at least one selected from the group consisting of information indicating that TAU corresponds to TAU after the UE does not perform periodic TAU, information indicating that TAU corresponds to TAU after the UE temporarily performs detach, information indicating that the UE is released from the TAU-less PSM, and information indicating that TAU corresponds to TAU after the UE infinitely requests a periodic TAU timer.

In the foregoing description, it is assumed that the MME does not change until the UE is switched off and switched on again. Yet, the MME at the time of switch off may be different from the MME at the time of switch on (a specific MME, which determines not to stop a service by continuously storing UE context although there is no communication with the UE for a long time). In this case, MME relocation may occur. In this case, (if the eNode B selects a different MME for load balancing), although the selected MME is in a TAU operation, the selected MME requests subscriber information to the HSS and obtains the information instead of requesting UE context to the old MME.

In the foregoing description, although the aforementioned description mainly focuses on the MME, the aforementioned description can be extensively applied a different network node. For example, the aforementioned description can be applied to a network node/function newly defined for a V2X service. If necessary, an operation proposed by the present invention can be achieved by performing interaction with the MME.

In the foregoing description, the D2D-related resource mainly corresponds to a radio resource, by which the present invention may be non-limited. In the present invention, the D2D-related resource may correspond to a resource used for at least one selected from the group consisting of a D2D discovery operation, a D2D communication operation, and other D2D operation.

Meanwhile, if the UE enters the PSM, the MME may perform an operation of deleting the UE context instead of notifying the infinitely configured TAU, notifying that it is not necessary to perform a periodic TAU via the TAU accept message, and configuring a TAU timer to be infinite. In addition, the MME may perform a purge operation on the HSS (it may refer to TS 23.401 paragraph 5.3.9.3). When the purge operation is performed, it may be able to add information to inform the HSS that the UE is temporarily detached instead of being completely detached. Although the UE is not completely detached, if the UE enters the PSM, since an access stratum function is deactivated, paging reception is not performed and a role of a serving node (i.e., a serving MME) becomes insignificant, it may be able to delete a context for a UE maintained by the MME.

The present invention can be extensively applied not only to a UE installed/mounted on a vehicle but also to a handheld device attached to a vehicle for the purpose of V2X. And, it is not mandatory that a mobility management method proposed by the present invention is applied to a V2X service only. For example, the mobility management method can also be applied to a service including a stationary characteristic and using a D2D service.

In the foregoing description, although a PSM not performing a TAU operation has been explained, the present invention can also be applied to a PSM not performing location update instead of the TAU. The location update may corresponds to a location update performed on a core network, a location update performed on a RAN, or a location update performed on both. A PSM can be regarded as various mechanisms developed for saving power/battery or a mechanism for deactivating a radio or access stratum instead of such a specific feature as a PSM.

In the foregoing description, the MME and the eNode B are described as a core network node and a RAN node, respectively. Yet, the MME and the eNode B respectively correspond to a network entity representing the core network and the RAN. Hence, it may have a different network entity capable of performing the aforementioned function as well as the MME and the eNode B.

Figure 10:
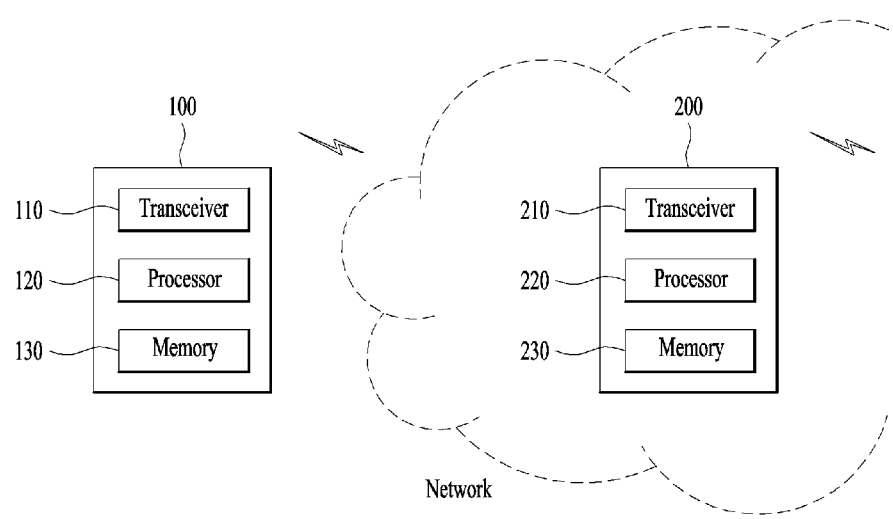
FIG. 10 is a diagram for a configuration of a node device according to embodiments of the present invention.

FIG. 10 is a diagram for configurations of a UE and a network node device according to embodiments of the present invention.

Referring to FIG. 10, a UE 100 according to the present invention may include a transceiver 110, a processor 120 and a memory 130. The transceiver 110 may be configured to transmit signals, data and information to an external device and to receive signals, data and information from the external device. The UE 100 may be connected to the external device in a wired or wireless manner. The processor 120 may control the overall operation of the UE 100 and may be configured to process information transmitted/received between the UE 100 and the external device. In addition, the processor 120 may be configured to perform UE operation proposed by the present invention. The memory 130 may store processed information for a predetermined time and may be replaced by a component such as a buffer (not shown).

Referring to FIG. 10, a network node 200 according to the present invention may include a transceiver 210, a processor 220 and a memory 230. The transceiver 210 may be configured to transmit signals, data and information to an external device and to receive signals, data and information from the external device. The network node 200 may be connected to the external device in a wired or wireless manner. The processor 220 may control the overall operation of the network node 200 and may be configured to process information transmitted/received between the network node 200 and the external device. In addition, the processor 220 may be configured to perform network node operation proposed by the present invention. The memory 230 may store processed information for a predetermined time and may be replaced by a component such as a buffer (not shown).

The aforementioned UE 100 and network node 200 may be implemented such that the above-described various embodiments of the present invention are independently applied or two or more thereof are simultaneously applied, and description of redundant parts is omitted for clarity.

The embodiments of the present invention may be achieved by various means, for example, hardware, firmware, software, or a combination thereof.

In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned various embodiments of the present invention are described with reference to examples applied to 3GPP LTE system, it may be applicable to various kinds of wireless communication systems as well as the 3GPP LTE system.

What is claimed is:

1. A method of transmitting and receiving a tracking area update (TAU)-less power saving mode (PSM)-related signal, which is transmitted and received by a mobility management entity (MME) in a wireless communication system, the method comprising:
   receiving, by the MME, a first TAU request message including information related to a TAU-less PSM entry from a user equipment (UE),
   wherein the information related to the TAU-less PSM entry includes information informing that the UE does not perform a periodic TAU;
   transmitting to the UE, by the MME, a TAU accept message in response to the first TAU request message;
   receiving from the UE, by the MME, a second TAU request message including information related to release of the TAU-less PSM, wherein the MME considers the second TAU request message containing the information related to the release of the TAU-less PSM as an attach request; and performing an attach procedure with the UE in response to the received second TAU request message.

2. The method of claim 1, wherein when the second TAU request message is received, the MME transmits an update location request (ULR) message to a home subscriber service (HSS).

3. The method of claim 1, wherein although the UE, which has transmitted the first TAU request message, does not transmit TAU, the MME does not detach the UE.

4. The method of claim 1, wherein the TAU accept message comprises information indicating an eNode B to allocate a device-to-device (D2D) resource to the UE.

5. The method of claim 4, wherein the D2D resource is used for uplink transmission of the UE in the TAU-less PSM.

6. The method of claim 1, wherein the MME deletes a context of the UE after the TAU accept message is transmitted.

7. The method of claim 1, wherein the TAU accept message includes information informing that TAU is infinitely configured.

8. The method of claim 1, wherein the TAU accept message includes information informing that a periodic TAU need not be performed.

9. The method of claim 1, wherein the information related to the TAU-less PSM entry includes at least one of information informing that the UE temporarily performs a detach operation, information informing that the UE performs the TAU-less PSM, information informing that the UE infinitely requests a periodic TAU timer, or information informing that the UE is able to use device-to-device (D2D) after the UE is switched off.

10. The method of claim 1, wherein the information related to the release of the TAU-less PSM includes at least one of information informing that a TAU after the UE does not perform periodic TAU, information informing that TAU corresponds to TAU after the UE temporarily performs a detach operation, information informing that the UE is released from the TAU-less PSM, or information informing a TAU after the UE infinitely requests a periodic TAU timer.

11. The method of claim 1, wherein the first TAU request message is transmitted when the UE is switched off.

12. The method of claim 1, wherein the second TAU request message is transmitted when the UE is switched on.

13. An mobility management entity (MME) for transmitting and receiving a tracking area update (TAU)-less power saving mode (PSM)-related signal in a wireless communication system, the MME comprising:
a transceiver; and
a processor configured to:
control the transceiver to receive a first TAU request message including information related to a TAU-less PSM entry from a user equipment (UE),
wherein the information related to the TAU-less PSM entry includes information informing that the UE does not perform a periodic TAU,
control the transceiver to transmit a TAU accept message in response to the first TAU request message,
control the transceiver to receive a second TAU request message including information related to release of the TAU-less PSM,
wherein the MME considers the second TAU request message including the information related to the release of the TAU-less PSM as an attach request, and
perform an attached procedure with the UE in response to the received second TAU request message.

* * * * *